(12) United States Patent
Ghaseminejad (10) Patent No.: US 6,510,403 B1
(45) Date of Patent: Jan. 21, 2003

(54) TIME CONSTRAINED SENSOR DATA RETRIEVAL SYSTEM AND METHOD

(75) Inventor: Parviz Ghaseminejad, Framingham, MA (US)

(73) Assignee: Microchip Technology Incorporated, Chandler, AZ (US)

( * ) Notice: Subject to any disclaimer, the term of this patent is extended or adjusted under 35 U.S.C. 154(b) by 29 days.

(21) Appl. No.: 09/695,966

(22) Filed: Oct. 25, 2000

Related U.S. Application Data
(60) Provisional application No. 60/161,946, filed on Oct. 28, 1999.

(51) Int. Cl.[7] ................................................. G06F 7/00
(52) U.S. Cl. ........................... 702/188; 702/47; 702/63; 702/64; 702/84; 702/176
(58) Field of Search ............................. 702/63, 64, 47, 702/84, 188, 176; 714/47; 320/139, 137

(56) References Cited

U.S. PATENT DOCUMENTS

| | | | | |
|---|---|---|---|---|
| 4,611,197 A | | 9/1986 | Sansky ........................ 340/522 |
| 5,321,627 A | * | 6/1994 | Reher ......................... 364/483 |
| 5,514,946 A | * | 5/1996 | Lin et al. ...................... 320/31 |
| 6,122,758 A | * | 9/2000 | Johnson et al. ............... 714/47 |

* cited by examiner

Primary Examiner—Marc S. Hoff
Assistant Examiner—Felix Suarez
(74) Attorney, Agent, or Firm—Baker Botts L.L.P.

(57) ABSTRACT

A system and method for time constrained retrieval of sensor data includes a sensor monitor system coupled to a plurality of sensors, wherein each sensor is coupled to a device having a variety of variable parameters to be sensed at intervals within a given timeframe. When at least some of the parameter values are relatively stable within the intervals, the sensor monitor system selectively requests parameter values from only a subset of the sensors at one or more intervals. However, preferably, a parameter value is obtained for each parameter at least once within the timeframe. In such a case, a current set of parameter values includes the most recently obtained parameter values for each parameter, regardless of the interval from which each parameter value was obtained.

27 Claims, 6 Drawing Sheets

| DEVICE # | INTERVAL T READ |
|---|---|
| 1 | I4 |
| 2 | I7 |
| 3 | I3 |
| 4 | I6 |
| 5 | I2 |
| 6 | I5 |
| 7 | I1 |
| 8 | I4 |
| 9 | I7 |
| 10 | I3 |
| 11 | I6 |
| 12 | I2 |
| 13 | I5 |
| 14 | I1 |
| 15 | I4 |
| 16 | I7 |
| 17 | I3 |
| 18 | I6 |
| 19 | I2 |
| 20 | I5 |
| 21 | I1 |
| 22 | I4 |
| 23 | I7 |
| 24 | I3 |
| 25 | I6 |
| 26 | I2 |
| 27 | I5 |
| 28 | I1 |
| 29 | I4 |
| 30 | I7 |

| DEVICE # | V READ | I READ | T READ |
|---|---|---|---|
| 1 | I7 | I7 | I4 |
| 2 | I7 | I7 | I7 |
| 3 | I7 | I7 | I3 |
| 4 | I7 | I7 | I6 |
| 5 | I7 | I7 | I2 |
| 6 | I7 | I7 | I5 |
| 7 | I7 | I7 | I1 |
| 8 | I7 | I7 | I4 |
| 9 | I7 | I7 | I7 |
| 10 | I7 | I7 | I3 |
| 11 | I7 | I7 | I6 |
| 12 | I7 | I7 | I2 |
| 13 | I7 | I7 | I5 |
| 14 | I7 | I7 | I1 |
| 15 | I7 | I7 | I4 |
| 16 | I7 | I7 | I7 |
| 17 | I7 | I7 | I3 |
| 18 | I7 | I7 | I6 |
| 19 | I7 | I7 | I2 |
| 20 | I7 | I7 | I5 |
| 21 | I7 | I7 | I1 |
| 22 | I7 | I7 | I4 |
| 23 | I7 | I7 | I7 |
| 24 | I7 | I7 | I3 |
| 25 | I7 | I7 | I6 |
| 26 | I7 | I7 | I2 |
| 27 | I7 | I7 | I5 |
| 28 | I7 | I7 | I1 |
| 29 | I7 | I7 | I4 |
| 30 | I7 | I7 | I7 |

TIME CONSTRAINED SENSOR DATA RETRIEVAL SYSTEM AND METHOD

CROSS REFERENCE TO RELATED APPLICATIONS

This application claims benefit of priority from U.S. Provisional Patent Application Serial No. 60/161,946, entitled Data Retrieval Scheme, filed Oct. 28, 1999.

FIELD OF THE INVENTION

The present invention generally relates to systems and methods for retrieving data from sensors. More specifically, the invention relates to systems and methods for the selective or time constrained collection of data from sensors.

BACKGROUND OF THE INVENTION

Sensors are used in a large variety of systems and for a large variety of purposes, generally, to provide an indication of the current state or value of a given parameter. Accordingly, there are a variety of types of sensors, for sensing different types of parameters. For example, a sensor may sense temperature, pressure, force, voltage or current level, sound level, humidity, position, or movement.

In a typical application, a sensor is used to detect a state of a multi-state device or may be used to provide a reading of a quantifiable value. For example, in a car alarm system a sensor for the driver's door may have two states: open and closed. The corresponding driver's door sensor may be configured to detect whether the door is open or closed and provide a signal to the alarm system to sound an alarm when the door is opened and the alarm system is enabled. In another situation a temperature sensor may read the temperature of a device or a fluid and provide a signal to an analog or digital display indicative of the value of the temperature.

A sensor may also be part of a feedback (or closed-loop) system, wherein the indication provided by the sensor serves as an input to a system that is configured to provide a countervailing response. For example, in an automobile cooling system, if a sensor reads a temperature that is above a maximum threshold, the sensor outputs a parameter value indicative of the temperature (i.e., parameter) that causes a controller to start a cooling radiator fan. The fan stays on until the sensor outputs a temperature parameter value to the controller that is below the threshold value.

In such systems, sensors are part of a larger computer controlled system, wherein sensor outputs serve as inputs to one or more controllers in the computer controlled system. The values of such inputs cause certain corresponding outputs of the controllers, to which other components in the system are responsive. Additionally, like the other components, the sensors may be driven by controller outputs. For example, one or more sensors may be queried periodically by control logic as part of a set of tasks that need to be performed within a given period of time.

However, typically, when there are multiple sensors to be queried within a very small time frame, e.g., a fraction of a second, it may be difficult or even impossible to consistently and reliably obtain an accurate sensor parameter value for each parameter sought to be sensed. This reliance on inaccurate parameter values approximations can lead to system errors or even failures.

SUMMARY OF THE INVENTION

The present invention is a system and method for time constrained retrieval of sensor data from a plurality of sensors. A set of sensors is coupled to a device having a variety of variable parameters to be sensed at intervals within a given timeframe. Each sensor may be configured to sense one parameter and, therefore, has its own address. Sensing a parameter involves a sensor obtaining and providing a corresponding parameter value, which may be done in response to a request issued by a sensor monitor system. When the intervals are relatively short, it is difficult to obtain and provide a parameter value for each parameter of each device, particularly if there are other tasks to be performed within the interval.

If, among these parameters, some parameters (and their parameter values) are relatively stable within the intervals, i.e., a parameter value has a slow rate of change, the sensor monitor system may selectively request parameter values from only a subset of the sensors at one or more intervals, in accordance with the present invention. However, preferably, a parameter value is obtained for each parameter at least once within the timeframe. In such a case, a current set of parameter values includes the most recently obtained parameter values for, preferably, each parameter, regardless of the interval from which each parameter value was obtained. This current set of parameter values may be made available to an application (or host) system that, in most cases, includes the devices being sensed.

The sensor monitor system includes a sensor manager that includes logic for requesting parameter values (i.e., data) from each sensor. This logic may be implemented in hardware, software, firmware or some combination thereof and may vary depending on the number and types of devices and corresponding parameters to be sensed. A timeframe comprised of a plurality of intervals is defined as a function of the application system's needs to obtain parameter values at the intervals, the timing of those needs, and the physical or systemic limitations to meeting those needs. Selectively, at least some of the parameters are sensed during each interval. In a sense, the sensor manager can be thought of as providing a scheduling and management function over the sensors for obtaining parameter values. That is, the sensor manager may issue requests to sensors to return parameter values at certain intervals. In some cases, the sensor manager will be configured to implement logic that returns parameter values within a processing loop dictated to the sensor monitor system by an application (or host) system.

As an example, an application system may require a value for each parameter of each device at an interval that is a fraction of a second. However, it may not be possible, or practical, to have all parameters sensed and parameter values available within such tight time constraints. As a result, the sensor manager efficiently orchestrates the gathering of parameter values from the sensors within the time constraints. If a subset of these parameters are not capable of or likely to significantly change within the interval, the control logic may be implemented to selectively abstain from obtaining parameter values for the entire subset during each interval. For example, if there are thirty devices each having the same three parameters to be sensed, but one of these parameters has a rate of change that is slow relative to the interval, than the sensor manager will be configured to obtain parameter values for only some of those slow changing parameters during each interval. However, preferably, each of those slow changing parameters will be sensed at least once during each timeframe.

Ultimately, the application system may require a complete current set of parameter values at each interval. In such a case, the sensor monitor system provides a current set of parameter values that includes the latest sensed parameter value of each parameter, even though some of these parameter values may have been obtained in previous intervals. Because only parameter values for slow changing parameters are taken from previous intervals, all parameter values in the current set of parameter values will be accurate within acceptable limits. This approach may be used in cases when all of the devices and their parameters are the same, or where there are a variety of devices having different types of parameters to be sensed. In either case, the present invention may distribute the sensing of slow changing parameter values over several intervals.

Additionally, the sensor monitor system may include logic that predicts whether certain parameters can be sensed less frequently than every interval or every timeframe. Such predictions may be based on historical parameter value data, wherein the sensor monitor system may be configured to store such historical data. Also, such predictions may be based on a relationship between various system parameters or events. For example, in an automobile, voltage of an electronics battery may be sensed every 100 ms interval when the car is running, but when the car is not running, voltage may be sensed every second, i.e., under conditions where the rate of change of the battery is slower than during normal operations.

BRIEF DESCRIPTION OF THE DRAWINGS

The foregoing and other objects of this invention, the various features thereof, as well as the invention itself, may be more fully understood from the following description, when read together with the accompanying drawings, described.

For the most part, and as will be apparent when referring to the figures, when an item is used unchanged in more than one figure, it is identified by the same alphanumeric reference indicator in all figures.

DETAILED DESCRIPTION OF THE PREFERRED EMBODIMENT

The present invention is a system and method for time constrained retrieval of sensor data from a plurality of sensors. A set of sensors is coupled to a device having a variety of variable parameters to be sensed at intervals within a given timeframe. Each sensor may be configured to sense a single parameter. Sensing a parameter involves obtaining and providing a corresponding parameter value, which may be done in response to a request issued by a sensor monitor system. When the intervals are relatively short, it is difficult to obtain and provide a parameter value for each parameter of each device, particularly if there are other tasks to be performed within the interval.

If, among these parameters, some parameters (and their parameter values) are relatively stable within the intervals, i.e., a parameter value has a slow rate of change, the sensor monitor system may selectively request parameter values from only a subset of the sensors at one or more intervals, in accordance with the present invention. However, preferably, a parameter value is obtained for each parameter at least once within the timeframe. In such a case, a current set of parameter values includes the most recently obtained parameter values for, preferably, each parameter, regardless of the interval from which each parameter value was obtained. This current set of parameter values may be made available to an application (or host) system that, in most cases, includes the devices being sensed.

Figure 1:
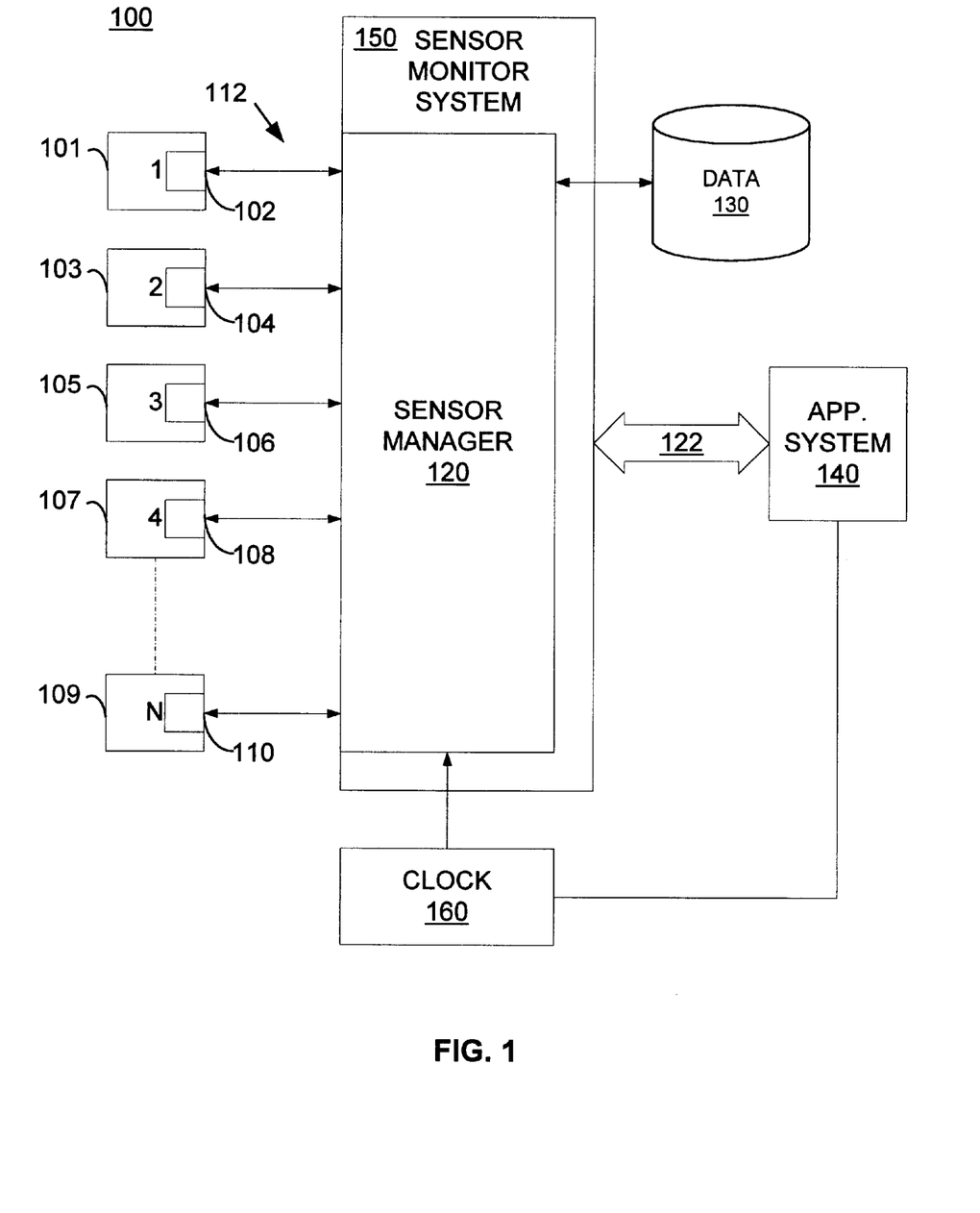
FIG. 1 is a block diagram of a system implementing a system and method for time constrained retrieval of sensor data from a plurality of sensors, in accordance with the present invention.

FIG. 1 shows an illustrative system configuration 100 implementing the present invention. As is shown, a set of 1 to N devices is included, such as devices 101, 103, 105, 107, and 109. Each device has a variety of parameters that can be sensed. In the preferred form, each device is coupled to a corresponding set of sensors adapted to obtain parameter values associated with the parameters of each device. That is, a set of sensors 102 is configured to sense values of parameters of device 1 101, a set of sensors 104 is configured to sense values of parameters of device 2 103, and so on. Sensors 102, 104, 106, 108, and 110 are coupled to a sensor monitor system 150, which derives parameter values from the output signals received from the sensors and, in turn, makes the parameter values available to other devices, such as application system 140. As will be appreciated by those skilled in the art, in other embodiments the sensors may be located at the sensor monitor system 150, particularly in the case of electrical devices, with conductive leads coupling the sensors to the devices.

In the preferred form, a sensor manager 120 generally controls the selective prompting of the sensors to provide parameter values. The selective prompting may be accomplished by sensor manager 120 issuing a request for a sensor to send data (i.e., a parameter value) or it may be accomplished by selectively reading a sensor that continually senses the parameter value. In either case, parameter values are provided when a sensor (e.g., sensor 102) provides a value signal across transmission path 112 (e.g., conductive wire, path, or bus) to sensor monitor system 150. Sensor monitor system 150 derives the parameter values from the value signals and stores each parameter value in memory, represented as database 130.

A clock (or timer) 160 may be included to impose a set of time intervals within a timeframe, wherein the sensor manager 120 selectively requests parameter values of at least some of the sensors at about each interval. The clock 160 may be provided in a variety of manners known in the art. For example, the clock may be provided by application system 140, within sensor monitor system 150, or external to both. If provided by application system 140, a clock signal may be provided over bus 122 to sensor monitor system 150.

Figure 2:
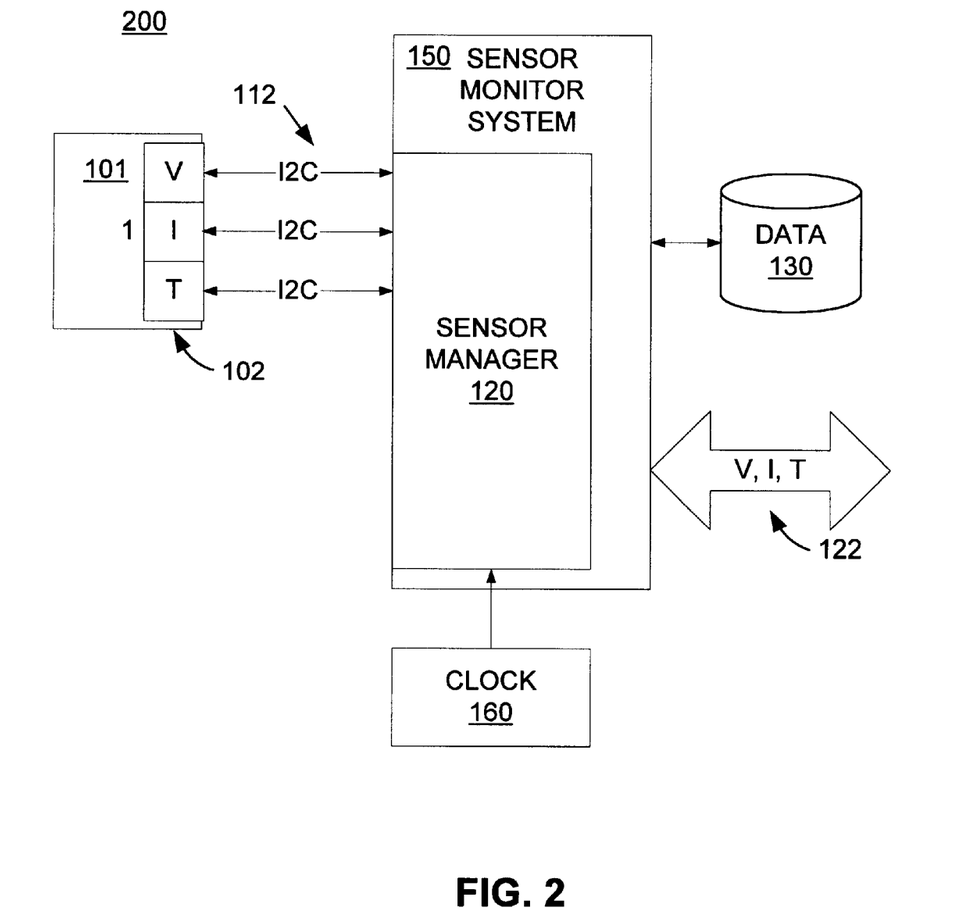
FIG. 2 is detailed block diagram of a portion of the system of FIG. 1.

In the embodiment of FIG. 2 devices 1 through N are 30 battery devices in series, each having a state of charge parameter and a temperature parameter. Bus 112 is a standard electronics "I²C-bus", and bus 122 is a standard CAN-bus, both are know in the art. The I²C-bus is preferably in accordance with the April 1995 specification published by Phillips Semiconductor. As an example, the battery devices may be 10.8V batteries used in, among other things, automotive applications. Although, it is not necessary that the devices be the same type of device or that the parameters to be sensed be the same for each device. The state of charge parameter may include a voltage (V) parameter and a current (I) parameter, as is shown. The rate of change of these parameters indicates the state of charge of a corresponding battery. When the rate (or slope) is near zero, the battery is, for the most part, fully charged. With a relatively large number of devices and parameters, such as 30 batteries with three parameters each, it can be difficult to sense each parameter value within a relatively short interval, e.g., under 1 second. The interval is often dictated by the processing loop of the application system 140. For example, in the illustrative embodiment, an automotive system requires these ninety (i.e., 30×3) battery parameter values within a 100 milliseconds (ms) interval (or processing loop).

Figure 3:
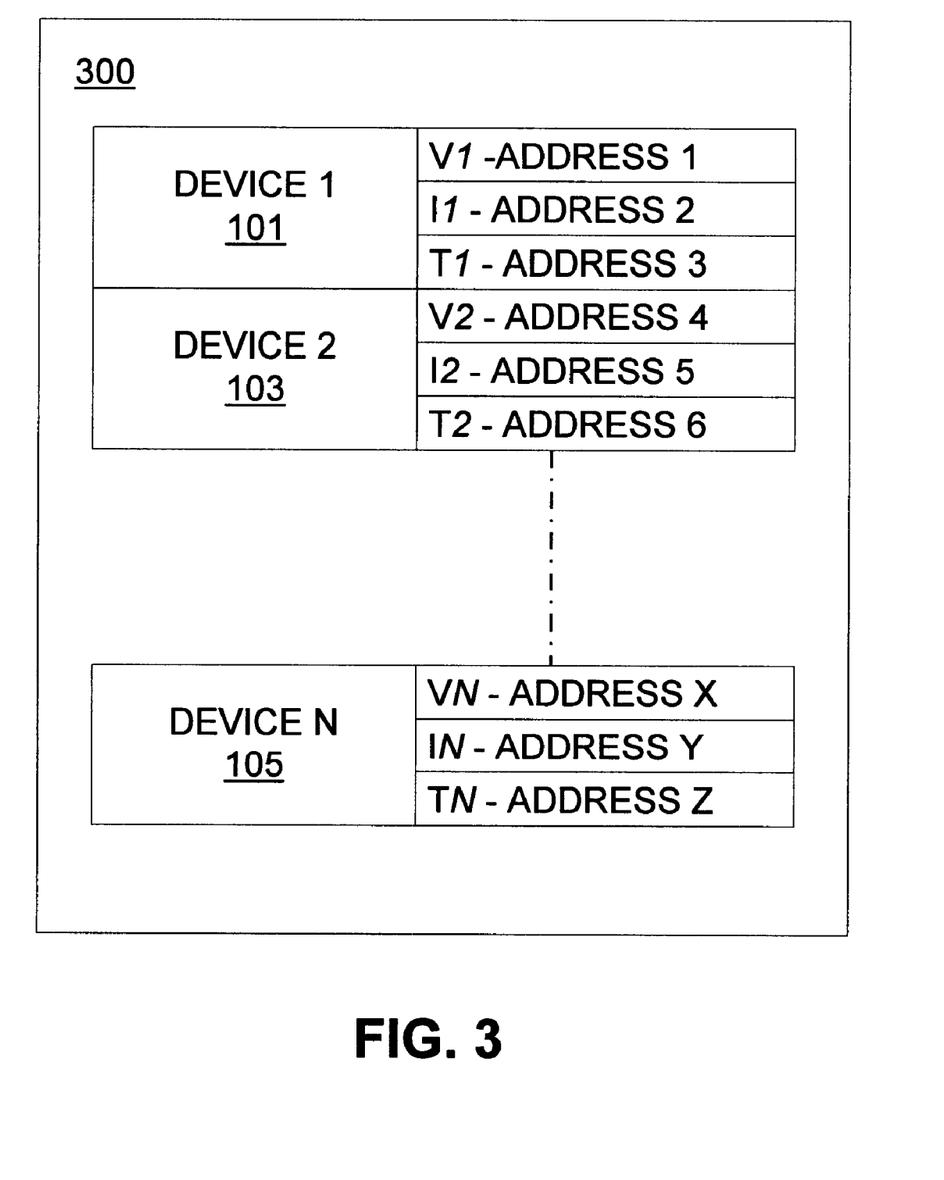
FIG. 3 is block diagram depicting a top level generic addressing scheme used with the sensors of FIG. 1.

Continuing with FIG. 2, in order to facilitate independent requesting and reading of each parameter value, each parameter of each battery has its own address. That is, as is shown in FIG. 3, for device 1 101, V1 has address 1, I1-has address 2, T1 has address 3 and for device 2 102, V2 has address 4, I2 has address 5 and T2 has address 6, and so on.

In the illustrative embodiment, the application system 140 expects or requires a parameter value for V, I, and T of each battery every 100 ms. Since the voltage and current parameter values can change very quickly relative to the 100 ms interval, it is preferable that these parameters be sensed within each 100 ms interval. It so happens that in the illustrative type of system, parameter values for each voltage and current parameter of each of the 30 batteries can be obtained relatively quickly, i.e., within the 100 ms interval. Although, it may take up to about 50 ms to calculate all I's, leaving insufficient time to determine each T. The temperature parameter values are not quickly obtainable, so it is extremely difficult to obtain and provide parameter values for all 30 temperature parameters, along with all 30 voltage and all 30 current parameters, in a single 100 ms interval.

The sensor manager 120 includes control logic that takes advantage of the relatively slow rate of change of temperature parameter values by selectively obtaining and providing parameter values for subsets of the temperature parameter values for the 30 batteries in each 100 ms interval. That is, while V and I are read for each battery in each 100 ms interval, T is read according to the following illustrative algorithm, wherein steps 1 through 6 are accomplished for each timeframe and steps 2 through 6 are accomplished for each interval wherein a 100 ms interval concludes when n >30 in step 5:

step 1: n=7, where n indicates the device being sensed
step 2: read T(n), where T(n) is the temperature parameter of device n
step 3: n=n+7
step 4: if n>30, then
step 5: n=n−30
step 6: go to step 2

Figure 4:
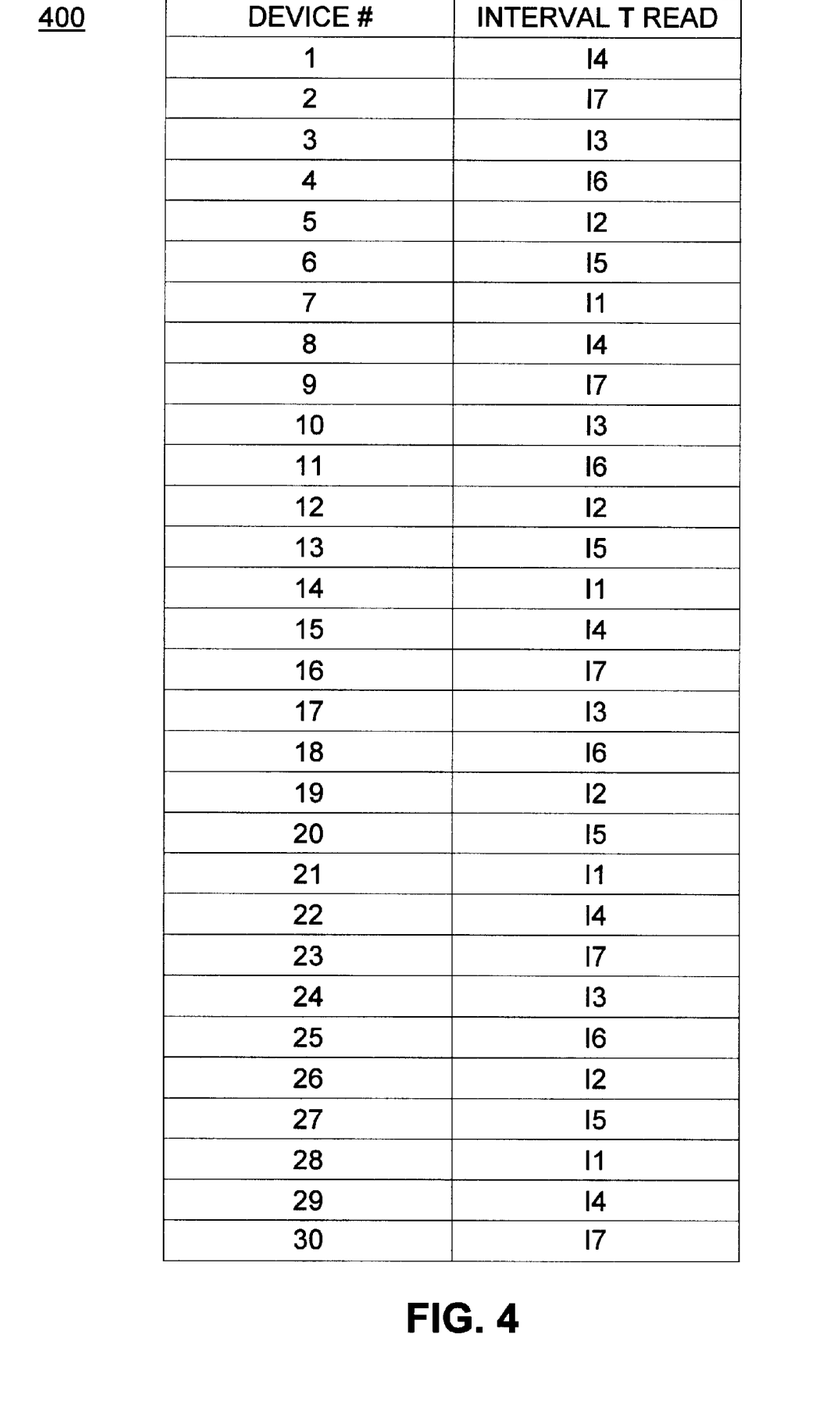
FIG. 4 is a table depicting the intervals in which the temperature parameters of each of 30 devices is sensed according to a control logic used with the system of FIG. 1.

As is illustrated by the table 400 of FIG. 4, each temperature parameter is read once over seven 100 ms intervals, yielding a timeframe of 700 ms, wherein interval 4, for example, relates to the fourth pass through step 5 and is indicated as "I4" in table 400. It should be appreciated that in the illustrative system, battery temperatures are typically stable over several seconds, so the battery temperature parameter values could be read less frequently than is shown above, thereby extending the timeframe, possibly to several seconds, within which all temperature parameters must be read at least once. However, in the illustrative embodiment, the temperature parameters are sensed as frequently as possible.

Figure 5:
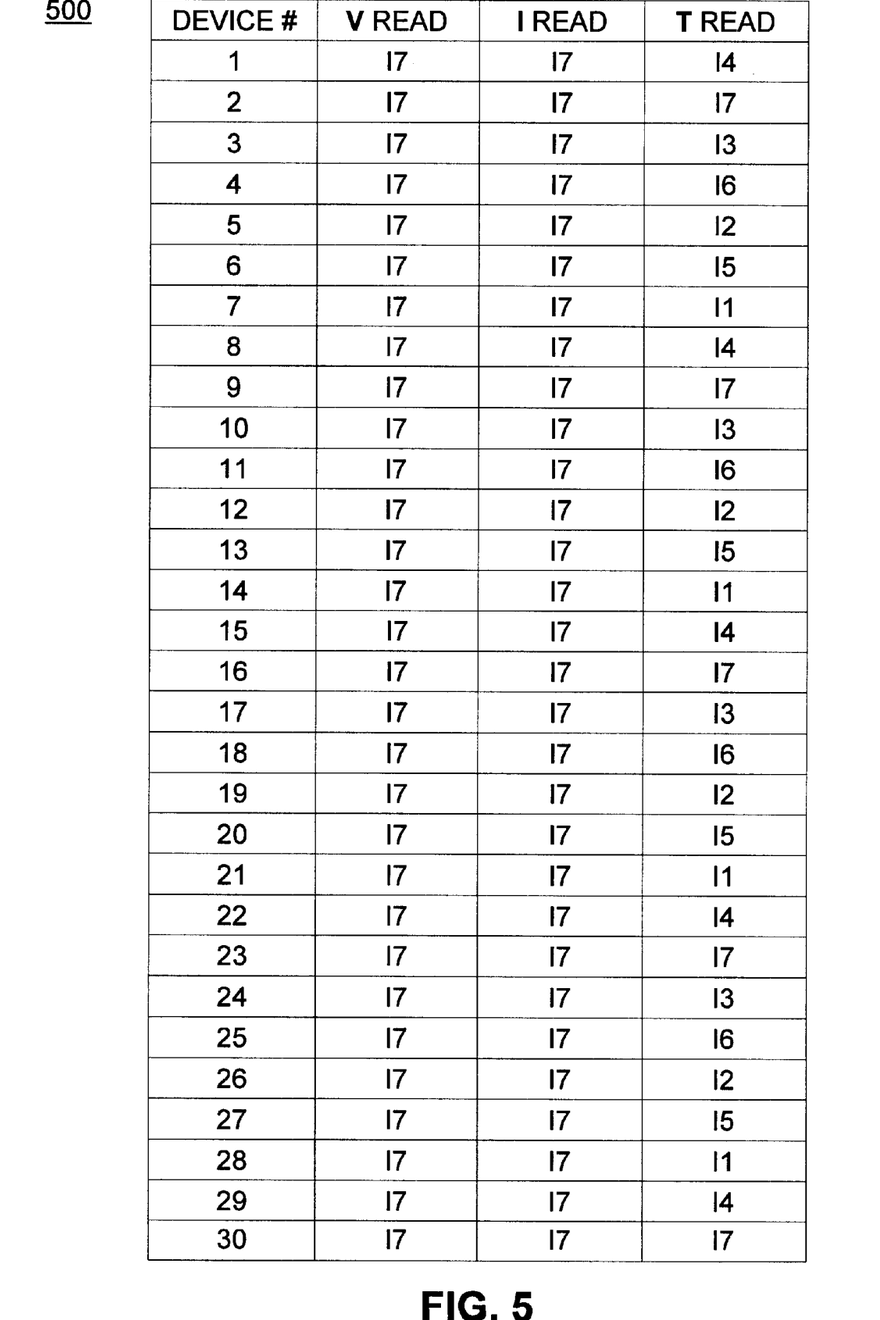
FIG. 5 is a table depicting the intervals in which a current set of parameter values is sensed, corresponding to the table of FIG. 4.

As previously mentioned, in the illustrative embodiment the application system 140 expects or requires a parameter value for V, I, and T of each battery every 100 ms, even though each temperature parameter is not read in each 100 ms interval. In the preferred form, the sensor manager 120 "fools" the application system by storing the last updated version of each parameter value as a current set of parameter values. Because all parameters are not sensed within each interval, the current set of parameter values includes parameter values from previous intervals. FIG. 5 is a table 500 demonstrating a representative current set of parameter values for devices 1 through 30 at the conclusion of interval 7, using the algorithm above and table 400 of FIG. 4. As an example, for device #1, the voltage and current parameter values were obtained in interval 7, while the temperature parameter value was obtained in interval 4.

Typically, the application system is simply looking for parameter values for voltage, current, and temperature parameters of each device, and is unaware of within which intervals these values were obtained. As long as the V,I, and T values in the current set of parameter values are substantially correct, the application system 140 will not experience errors due to stale parameter values. This is ensured by reading each parameter value within a timeframe that is not longer than the time it takes for that parameter to adversely change, as dictated by that parameter's rate of change. The control logic may be implemented in a variety of manners, and tradeoffs made between speed and accuracy in obtaining and providing parameter values.

Additionally, the sensor monitor system 150 may include a prediction logic to predict at which intervals certain parameters may be sensed. In such a case, database 130 may store historical data used in the predictions. For example, historical data may show that V changes very little over two intervals, so the logic may be adjusted to sense V of the first 15 batteries in every odd interval (e.g., interval 1, interval 3, and so on) and then to sense V of the second 15 batteries in every even interval (e.g., interval 2, interval 4, and so on). In other embodiments, the prediction logic may be configured to detect relationships between parameters (or other system dynamics). That is, the prediction logic of the sensor monitor system 150 may determine (e.g., based on historical data) that when V and I are substantially constant, T is very slowly changing. In response, the control logic may be automatically adjusted to sense each T once every other timeframe when these other conditions are true, rather than once every time frame as described above.

Figure 6:
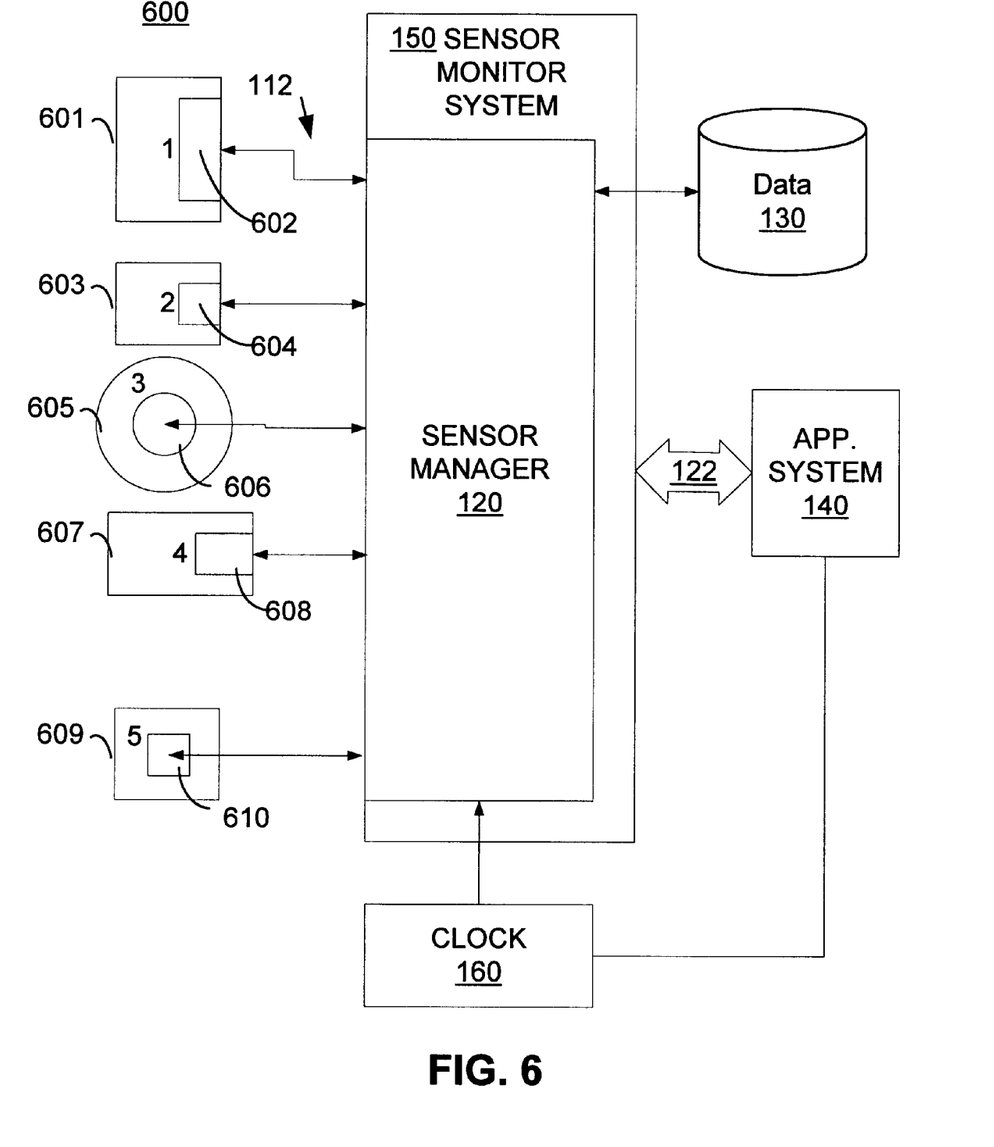
FIG. 6 is an alternate embodiment of a system implementing a system and method for time constrained retrieval of sensor data from a plurality of sensors of different types and having different parameters, in accordance with the present invention.

In other embodiments, the system may include a variety of devices and a variety of sensors under the control of sensor monitor system 150. For example, FIG. 6 shows five different sets of sensors, each sensing different parameters of different devices, 601, 603, 605, 607, and 609. For example, devices 1 601 and 2 603 may be different types of batteries having V, I and T sensed for each battery, while device 3 605 may be a device having pressure sensed, device 4 607 may be a container having fluid level and temperature sensed and device 5 609 may be an integrated circuit (IC) having only temperature sensed, but wherein the rate of change of temperature for the IC may be much greater than that of batteries 1 601 and 2 603 and the fluid in device 4 607.

Depending on the impact of the changes in these various parameters of the various devices to application system 140, the sensor manager 120 may be configured to sense different parameters at different intervals within a timeframe or within different timeframes. The actual logic employed, as will be appreciated by those skilled in the art, may depend on a number of factors, such as rates of change of the various parameters, threshold device and application system parameters. That is, it may be essential for the system that the fluid level in device 4 never get below 3 quarts, or that the temperature of IC 5 never gets above 100 degrees C. As a result, with a 100 ms interval (or loop) example, the IC temperature parameter may get sensed every other interval, while the V and I of batteries 1 and 2 may get sensed at every interval, while fluid level in device 4 may get sensed only once in each timeframe, and so on.

The invention may be embodied in other specific forms without departing from the spirit or central characteristics thereof. The present embodiments are therefore to be considered in all respects as illustrative and not restrictive, the scope of the invention being indicated by appending claims rather than by the foregoing description, and all changes that come within the meaning and range of equivalency of the claims are therefore intended to be embraced therein.

What is claimed is:

1. A time constrained sensor data retrieval system comprising:
   A. a set of devices, each device having one or more variable parameters;
   B. a set of sensors coupled to each device and configured to sense a parameter value associated with each of said parameters and configured to generate a value signal representative of each of said parameter values; and
   C. a monitor system coupled to said set of sensors and configured to receive said value signals and derive therefrom and store said parameter values, said monitor system including:
      1) a sensor manager configured to selectively request said parameter values from said sensors at least one of a plurality of intervals within a timeframe, at least some requests being generated as a function of a rate of change of the corresponding parameter value; and
      2) a storage device configured to store a set of current parameter values, wherein said current set of parameter values is comprised of the most recently requested parameter value of each parameter.

2. A system as in claim 1, wherein said sensor manager is configured to request a parameter value for each parameter at least once within each timeframe.

3. A system as in claim 1, wherein said monitor system includes:
   3) a predictor, configured to determine for at least a first device the interval or intervals within which a parameter of said first device will be sensed.

4. A system as in claim 1, wherein said intervals are a function of a cycle of a periodic clock.

5. A system as in claim 1, wherein said intervals are about 100 millisecond intervals and said timeframe is about 1 second or less.

6. A system as in claim 1, wherein said devices include a plurality of batteries in series, each battery having parameters that include:
   1) a state of charge parameter; and
   2) a temperature parameter.

7. A system as in claim 6, wherein said state of charge parameter includes a voltage parameter and a current parameter.

8. A system as in claim 1 wherein, for one or more of said devices, a corresponding slow changing parameter value is substantially unchanged over a plurality of intervals and said sensor manager is configured to abstain from requesting said slow changing parameter value at each interval but does selectively request said slow changing parameter value at least once prior to said slow changing parameter value substantially changing.

9. A system as in claim 1 wherein said sensor manager is configured to make a determination of which intervals at least a subset of said parameter values should be requested.

10. A system as in claim 9 wherein said determination is made as a function of a prediction of the rate of change of the parameter values of said subset of parameter values.

11. A system as in claim 9 wherein said prediction is made as a function of historical parameter value data.

12. A system as in claim 9 wherein said monitor system is configured to determine said timeframe and said intervals as a function of said rates of change.

13. A system as in claim 1 wherein said set of devices includes dissimilar devices having at least some dissimilar parameters.

14. A system as in claim 1 wherein each sensor has an address within the system.

15. A time constrained sensor data retrieval system comprising:
   A. a set of batteries, each battery having one or more variable parameters, including a temperature parameter, a voltage parameter, and a current parameter;
   B. a set of sensors coupled to each device and configured to sense a parameter value associated with each of said parameters and configured to generate a value signal representative of each of said parameter values; and
   C. a monitor system coupled to said set of sensors and configured to receive said value signals and derive therefrom and store said parameter values, said monitor system including:
      1) a sensor manager configured to selectively request said parameter values from said sensors at at least one of a plurality of intervals within a timeframe, at least some requests being generated as a function of a rate of change of the corresponding parameter value; and
      2) a storage device configured to store a set of current parameter values, wherein said current set of parameter values is comprised of the most recently updated parameter value of each parameter, wherein a rate of change of said temperature parameter is such that a corresponding temperature parameter value is substantially unchanged over at least one interval and said sensor manager abstains from requesting an update to said temperature parameter value for at least one interval within said timeframe.

16. A method of time constrained sensor data retrieval in a system including a set of devices, each device having one or more variable parameters, coupled to a set of sensors, wherein said sensors are coupled to a monitor system configured to store and request parameter values corresponding to said parameters, said method comprising:
   A. determining a timeframe comprised of a plurality of intervals;
   B. determining a rate of change of each parameter value;
   C. requesting parameter values from said sensors at at least one of said intervals, at least some requests being generated as a function of said parameter value rates of change; and
   D. updating a stored set of current parameter values with said requested parameter values, wherein said current set of parameter values is comprised of the most recently stored parameter value of each parameter.

17. The method of claim 16, wherein said requesting in element C includes requesting a parameter value for each parameter at least once within each timeframe.

18. The method of claim 16 further including:
   E. outputting said set of current parameter values to an application system.

19. The method of claim 16, wherein said intervals are a function of a cycle of a periodic clock.

20. The method of claim 16, wherein said intervals are about 100 millisecond intervals and said timeframe is about 1 second or less.

21. The method of claim 16, wherein said devices include a plurality of batteries in series, each battery having parameters that include:
   1) a state of charge parameter; and
   2) a temperature parameter.

22. The method of claim 21, wherein a rate of change of said temperature parameter is such that a corresponding temperature parameter value is substantially unchanged over at least one interval and said sensor manager abstains from requesting an update to said temperature parameter value for at least one interval within said timeframe.

23. The method of claim 21, wherein said state of charge parameter includes a voltage parameter and a current parameter.

24. The method of claim 16, wherein said monitor system is configured to accomplish, in element B, at least a subset of said determining of said rates of changes.

25. The method of claim 16, wherein element B includes predicting at least a subset of said rates of changes, and wherein said determining is made as a function of said predictions.

26. The method of claim 25, wherein predicting is accomplished as a function of historical parameter value data.

27. The method of claim 16, wherein in element A said monitor system is configured to accomplish said determining of said timeframe and said intervals.

* * * * *